(12) United States Patent
Yi et al.

(10) Patent No.: US 7,180,837 B2
(45) Date of Patent: Feb. 20, 2007

(54) OPTICAL PICKUP INCLUDING AN OPTICAL MODULATOR, AND AN OPTICAL APPARATUS COMPRISING THE OPTICAL PICKUP

(75) Inventors: Jong-Su Yi, Kyunggi-Do (KR); Sang-Kyeong Yun, Kyunggi-Do (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 545 days.

(21) Appl. No.: 10/635,524

(22) Filed: Aug. 7, 2003

(65) Prior Publication Data
US 2004/0233827 A1 Nov. 25, 2004

(30) Foreign Application Priority Data
May 21, 2003 (KR) ............... 10-2003-0032338

(51) Int. Cl.
*G11B 7/00* (2006.01)
(52) U.S. Cl. .................. 369/44.37; 369/44.14; 369/112.08
(58) Field of Classification Search ......... 369/44.37, 369/44.14, 112.08
See application file for complete search history.

(56) References Cited

U.S. PATENT DOCUMENTS

| 6,385,143 B1 | 5/2002 | Sasaki | |
| 6,671,247 B1* | 12/2003 | Arai et al. | 369/112.01 |
| 2003/0185134 A1* | 10/2003 | Kimura et al. | 369/112.08 |

FOREIGN PATENT DOCUMENTS

| JP | 02-177131 | 7/1990 |
| JP | 06-069577 | 3/1994 |
| JP | 2002-504734 | 2/2002 |

* cited by examiner

*Primary Examiner*—Gautam R. Patel
(74) *Attorney, Agent, or Firm*—Morgan, Lewis & Bockius, LLP

(57) ABSTRACT

The present invention relates to an optical pickup, and more particularly to an optical pickup comprising an optical modulator for reflecting and diffracting an incident light beam to generate multiple beams, and the optical pickup simultaneously reads a plurality of data bits using multiple beams at the time of reading optical disc information, thus promptly processing optical disk information, thereby the optical pickup of the present invention can cope with various types of optical disk media using light beams with different wavelengths.

14 Claims, 13 Drawing Sheets

OPTICAL PICKUP INCLUDING AN OPTICAL MODULATOR, AND AN OPTICAL APPARATUS COMPRISING THE OPTICAL PICKUP

BACKGROUND OF THE INVENTION

1. Field of the Invention

The present invention relates generally to an optical pickup, and more particularly to an optical pickup and optical recording and reproducing apparatus using the same, which can promptly process optical disk information without increasing a rotation speed of an optical disk, and cope with various types of optical disk media using light beams with different wavelengths.

2. Description of the Related Art

Generally, an optical pickup is a device for reproducing signals recorded on various optical disks or recording signals on optical disks. Recently, an optical pickup having a large storage capacity and a high processing speed has been developed.

First, the development trend of the storage capacity of an optical pickup is described below.

Recently, Digital Versatile Disk (DVD) and Compact Disk (CD) products have been generally used.

For example, CD products store information of 650 MB using a light beam with a wavelength of 780 nm, and DVD products store information of 4.7 GB using a light beam with a wavelength of 650 nm.

Meanwhile, with the beginning of High Definition (HD) broadcasting, Blu-ray products capable of sufficiently storing various information have been developed.

The Blu-ray products are planned to increase the information storage capacity to store information with a capacity equal to or greater than 25 GB using a light beam with a wavelength of 405 nm.

As described above, an optical pickup recording manner has been rapidly developed.

That is, a smaller beam spot can be formed using a short wavelength light beam, and higher information recording density can be realized using the smaller beam spot.

However, since the development speed of the recording manner is higher than the expansion speed of markets, a great number of consumers desire products in which both a large capacity recording medium and an inexpensive recording medium with small capacity can be compatibly used.

However, optical pickups marketed until now are problematic in that, since they cannot fully cope with various types of optical recording media, such as CD products, DVD products and Blu-ray products, the optical pickups do not satisfy to consumers.

Next, the development trend of the information processing speed of optical pickups is described below.

Recently, products which increase an information processing speed by increasing the rotation speed of an optical disk have been marketed. However, these products have disadvantages due to the increase of the rotation speed.

For example, if the rotation speed of an optical disk increases, very high flatness is required in the optical disk to correct the focus of light beams, thus increasing the cost of the optical disk due to the requirement.

Therefore, an optical pickup constructed to increase an information processing speed using multiple beams without increasing the rotation speed of an optical disk is disclosed in U.S. Pat. No. 6,385,143.

FIG. 1 is a view showing the construction of the optical pickup of the U.S. Pat. No. 6,385,143.

An operation of the optical pickup is described with reference to FIG. 1. A light beam 3 generated by a laser diode 4 is divided into multiple beams 3-1, 3-2, 3-3, 3-4 and 3-5 by a grating 5. The multiple beams pass through a beam splitter 6 and are converted into parallel beams by a collimator lens 7, and the parallel beams are focused on an optical disk 1 by an objective lens 8.

Beams reflected from respective tracks are converted into parallel beams by the objective lens 8 and are focused on a photo detector 2 (photo diode array) by the collimator lens 7. At this time, since the beam splitter 6 is disposed between the photo detector 2 and the collimator lens 7, focused beams propagate toward the photo detector 2 without returning to the grating 5.

Multiple beams, diffracted and generated by the grating 5, correspond to respective tracks, and a light beam reflected from each of the tracks corresponds to a cell of the photo detector 2. Therefore, pieces of track information corresponding to the respective beams are transmitted to the corresponding cells of the photo detector 2, and converted into electrical signals by the photo detector 2.

Due to this construction, the optical pickup can promptly process optical disk information using multiple beams without increasing the rotation speed of the optical disk.

However, the conventional optical pickup is problematic in that, since it employs a fixing diffraction grating allowing only light of a specific wavelength, the optical pickup cannot cope with various optical disk media using light beams with different wavelengths.

SUMMARY OF THE INVENTION

Accordingly, the present invention has been made keeping in mind the above problems occurring in the prior art, and an object of the present invention is to provide an optical pickup, which can promptly process optical disk information while coping with various types of optical disk media using light beams with different wavelengths.

Another object of the present invention is to provide an optical recording and reproducing apparatus using the optical pickup.

In order to accomplish the above objects, the present invention provides an optical pickup, comprising a light source module for selectively generating a plurality of light beams with different wavelengths; an achromatic lens for converting the light beams into parallel beams; a beam splitter disposed on an optical path to pass the light beams therethrough and reflect the light beams; an optical modulator converted to correspond to wavelengths of the light beams generated by the light source module and designed to divide each of incident light beams having passed through the beam splitter into multiple beams, and reflect and diffract the multiple beams in a direction of the beam splitter; an objective lens for focusing multiple beams, reflected and diffracted by the optical modulator and then reflected from the beam splitter in a direction of an optical disk, on corresponding tracks of the optical disk; and a photo detector for detecting multiple beams reflected from the tracks of the optical disk and converting the detected multiple beams into electrical signals.

Preferably, the optical pickup further comprises a sensor lens for focusing the multiple beams, reflected from the tracks of the optical disk, on corresponding cells of the photo detector.

Preferably, the light source module is formed so that light emitting surfaces for emitting the light beams with different wavelengths are arranged on an identical plane.

Preferably, the light beams are formed so that a first light beam with a first wavelength, generated at a center portion of the light source module among the plurality of light beams, has the same central path as a 0 order diffraction light beam of multiple beams formed while being reflected and diffracted by the optical modulator, a second light beam with a second wavelength has the same central path as a −1 order diffraction light beam of the multiple beams, and a third light beam with a third wavelength has the same central path as +1 order diffraction light beam of the multiple beams.

Preferably, the plurality of light beams are light beams with wavelengths of 405 nm, 650 nm and 780 nm, respectively.

Preferably, the beam splitter is a polarization beam splitter, the optical pickup further comprising quarter wave plates are disposed between the polarization beam splitter and the optical modulator, and between the polarization beam splitter and the objective lens, respectively, to convert a light beam into a circularly polarized beam.

In addition, the present invention provides an optical pickup, comprising a light source module for selectively generating a plurality of light beams with different wavelengths, the light source module having light emitting surfaces for different wavelengths arranged on different planes to correct color aberrations; a collimator lens for converting the light beams into parallel beams; a beam splitter disposed on an optical path to pass the light beams therethrough and reflect the light beams; an optical modulator converted to correspond to wavelengths of the light beams generated by the light source module and designed to divide each of incident light beams having passed through the beam splitter into multiple beams, and reflect and diffract the multiple beams in a direction of the beam splitter; an objective lens for focusing multiple beams, reflected and diffracted by the optical modulator and then reflected from the beam splitter in a direction of an optical disk, on corresponding tracks of the optical disk; and a photo detector for detecting multiple beams reflected from the tracks of the optical disk and converting the detected multiple beams into electrical signals.

Preferably, the optical pickup further comprises a sensor lens for focusing the multiple beams, reflected from the tracks of the optical disk, on corresponding cells of the photo detector.

Preferably, if the collimator lens is a refractive lens, a light beam incident from a light emitting surface positioned close to the collimator lens among the plurality of light beams with different wavelengths, generated by the light source module, is a light beam with a short wavelength, and a light beam incident from a light emitting surface positioned far from the collimator lens is a light beam with a long wavelength.

Preferably, if the collimator lens is a diffractive lens, a light beam incident from a light emitting surface positioned close to the collimator lens among the plurality of light beams with different wavelengths, generated by the light source module, is a light beam with a long wavelength, and a light beam incident from a light emitting surface positioned far from the collimator lens is a light beam with a short wavelength.

Preferably, the light beams are formed so that a first light beam with a first wavelength, generated at a center portion of the light source module among the plurality of light beams, has the same central path as a 0 order diffraction light beam of multiple beams formed while being reflected and diffracted by the optical modulator, a second light beam with a second wavelength has the same central path as a −1 order diffraction light beam of the multiple beams, and a third light beam with a third wavelength has the same central path as +1 order diffraction light beam of the multiple beams.

Preferably, the plurality of light beams are light beams with wavelengths of 405 nm, 650 nm and 780 nm, respectively.

Preferably, a polarization beam splitter is used as the beam splitter to increase optical efficiency, and the optical pickup further comprises quarter wave plates are disposed between the polarization beam splitter and the optical modulator, and between the polarization beam splitter and the objective lens, respectively, to convert a light beam into a circularly polarized beam.

Further, the present invention provides an optical recording and reproducing apparatus produced using the above optical pickup.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
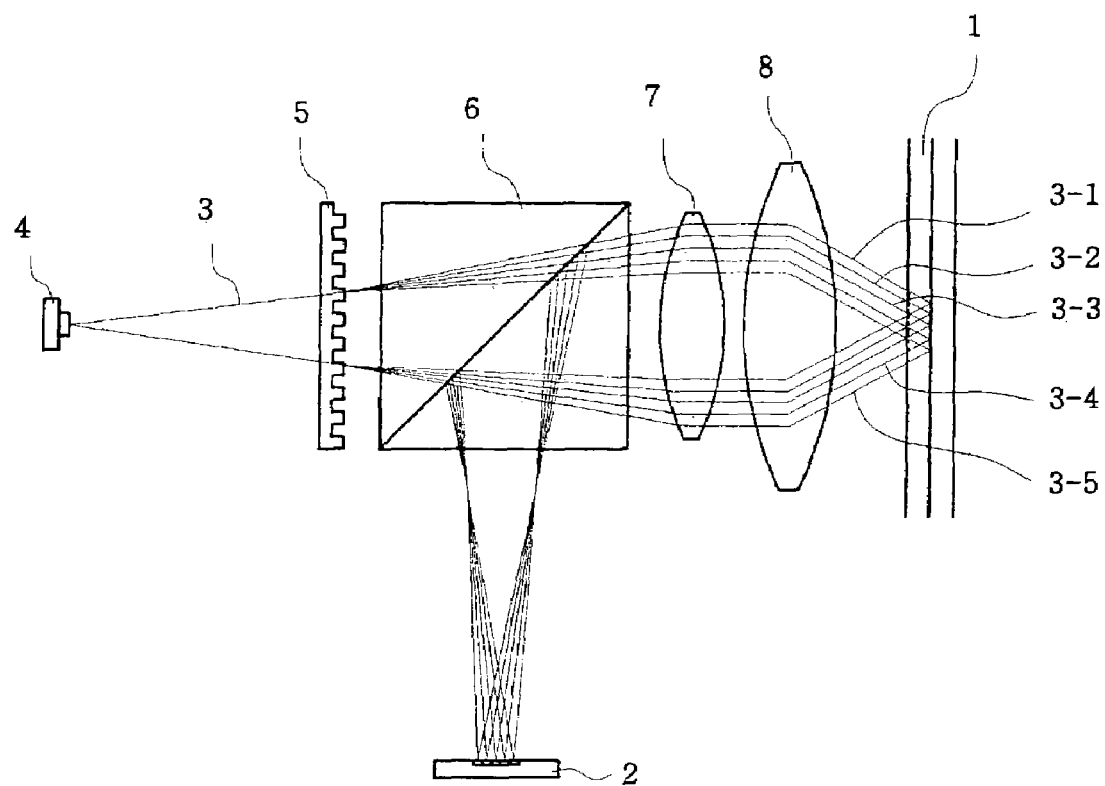
FIG. 1 is a view showing the construction of a conventional optical pickup.
Figure 2:
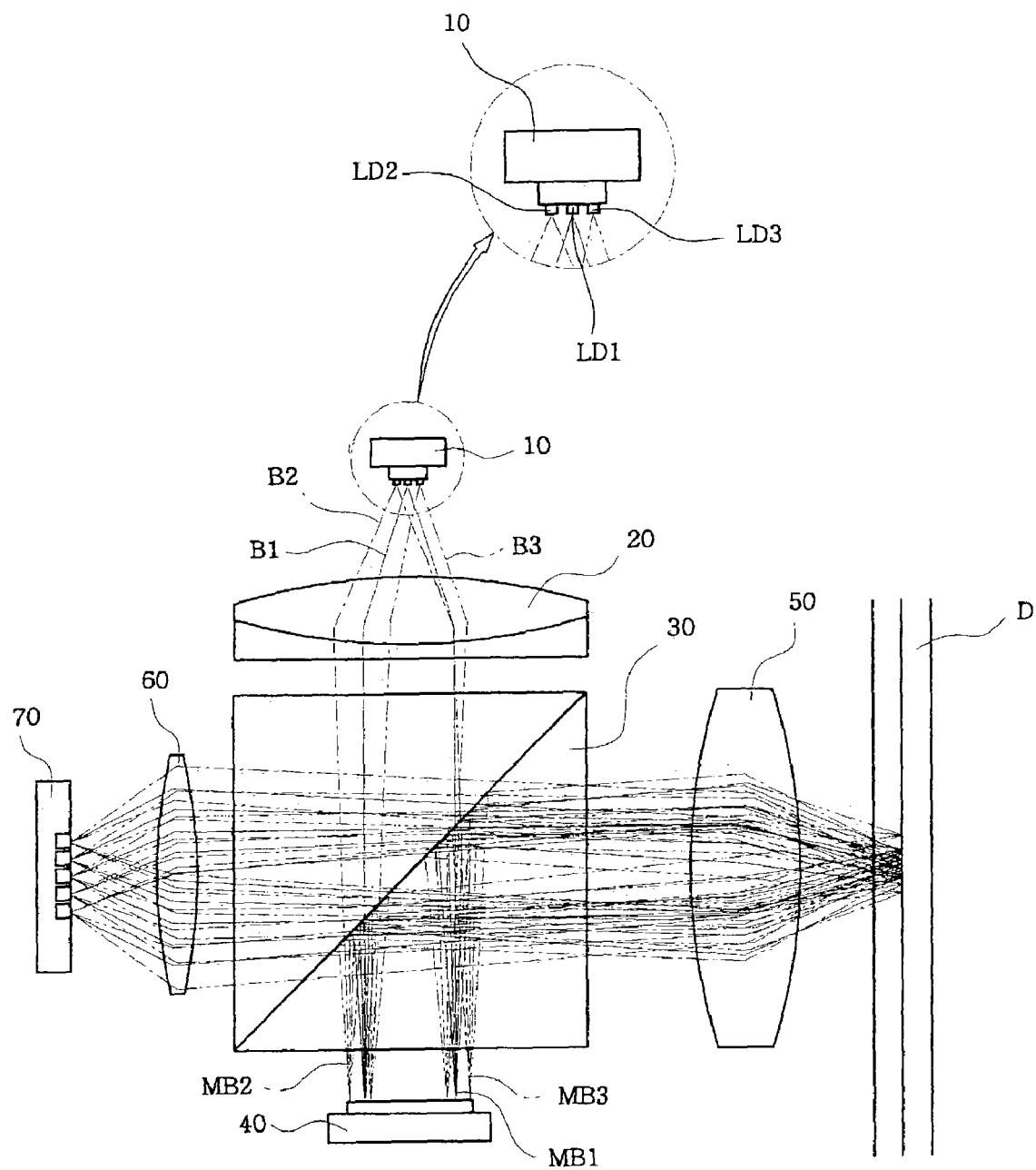
FIG. 2 is a view showing the construction of an optical pickup according to an embodiment of the present invention.

FIG. 2 is a view showing the construction of an optical pickup according to an embodiment of the present invention.

Referring to FIG. 2, the optical pickup of the present invention is constructed so that light beams B1, B2 and B3 generated by a light source module 10 are converted into parallel beams by an achromatic lens 20, the parallel beams pass through a beam splitter 30 and are converted into three multiple-beam groups MB1, MB2 and MB3, respectively, while being reflected and diffracted by an optical modulator 40, and the multiple-beam groups MB1, MB2 and MB3 are reflected again from the beam splitter 30 and are respectively focused on corresponding tracks of an optical disk D through an objective lens 50.

Further, multiple-beam groups reflected from the optical disk D are focused on corresponding cells of the photo detector 70 through a sensor lens 60, and converted into electrical signals by the photo detector 70.

In this case, the light source module 10, is constructed to selectively generate the plurality of light beams B1, B2 and B3 with different wavelengths.

That is, three chips LD1, LD2 and LD3 are provided in the light source module 10 to emit the light beams B1, B2 and B3 with different wavelengths, and are arranged on an identical plane while being spaced apart from each other by a predetermined distance.

The light source module 10 is preferably constructed so that the chip LD1 disposed in a center portion of the light source module 10 generates the light beam B1 with a wavelength of 650 nm applied to DVD products, the chip LD2 arranged on one side of the chip LD1 generates the light beam B2 with a wavelength of 780 nm applied to CD products, and the chip LD3 arranged on the other side of the chip LD1 generates the light beam B3 with a wavelength of 405 nm applied to Blu-ray products.

Further, the achromatic lens 20 is constructed to convert the generated light beams into parallel beams, and the beam splitter 30 is constructed to pass light beams therethrough and reflect the light beams.

Further, the optical modulator 40 diffracts and modulates incident light beams while being switched to correspond to the wavelengths of light beams generated by the light source module 10. Since the operating principles of the optical modulator 40 are well known in the field, they are described below in brief.

That is, a plurality of unit cells are arranged on a substrate, both ends of each of the cells are fixed to the substrate, and a center portion thereof is arranged to be spaced apart from the substrate. Further, the cells are alternately connected to a means capable of applying a voltage.

In this case, if a voltage is not applied to the cells, all the cells are arranged on an identical plane, so that the cells reflect perpendicularly incident light beams as they are. That is, a mode in which diffraction of the incident light beams does not occur is performed.

However, if a voltage is applied to the cells, only cells applied with an electric field are bent toward the substrate, so that the optical modulator 40 forms a grating structure. Therefore, a mode in which diffraction of the incident light beams occurs is performed.

Therefore, such a reflection and diffraction type optical modulator 40 can adjust the quantity of diffracted light and a diffraction angle depending on the applied voltage and the construction of the optical modulator 40. Consequently, the optical modulator 40 can reflect and diffract incident light beams while being switched depending on the wavelengths of incident light beams.

Properly, the optical modulator of the present invention is not limited to the above-described example, and all reflection and diffraction type optical modulators can be applied to the present invention.

Preferably, if one of three multiple-beam groups MB1, MB2 and MB3 with different wavelengths uses ±N order diffraction light beams, another thereof uses −(N+1) to (N−1) order diffraction beams, and the other thereof uses −(N−1) to (N+1) order diffraction beams, wherein the multiple-beam groups MB1, MB2 and MB3 are formed while being reflected and diffracted by the optical modulator 40.

Further, the objective lens 50 is constructed to focus light beams propagating toward the optical disk D and convert light beams reflected from the optical disk D into parallel beams.

Further, the sensor lens 60 is constructed to focus multiple-beam groups MB1, MB2 and MB3 reflected and diffracted from signal tracks of the optical disk D on corresponding cells of the photo detector 70. The photo detector 70 converts information corresponding to respective multiple-beam groups MB1, MB2 and MB3 into electrical signals.

The optical pickup according to the embodiment of the present invention constructed as described above generates light beams with wavelengths of 650 nm, 780 nm and 405 nm, respectively. Optical paths of the light beams with different wavelengths are described below.

Figure 3A:
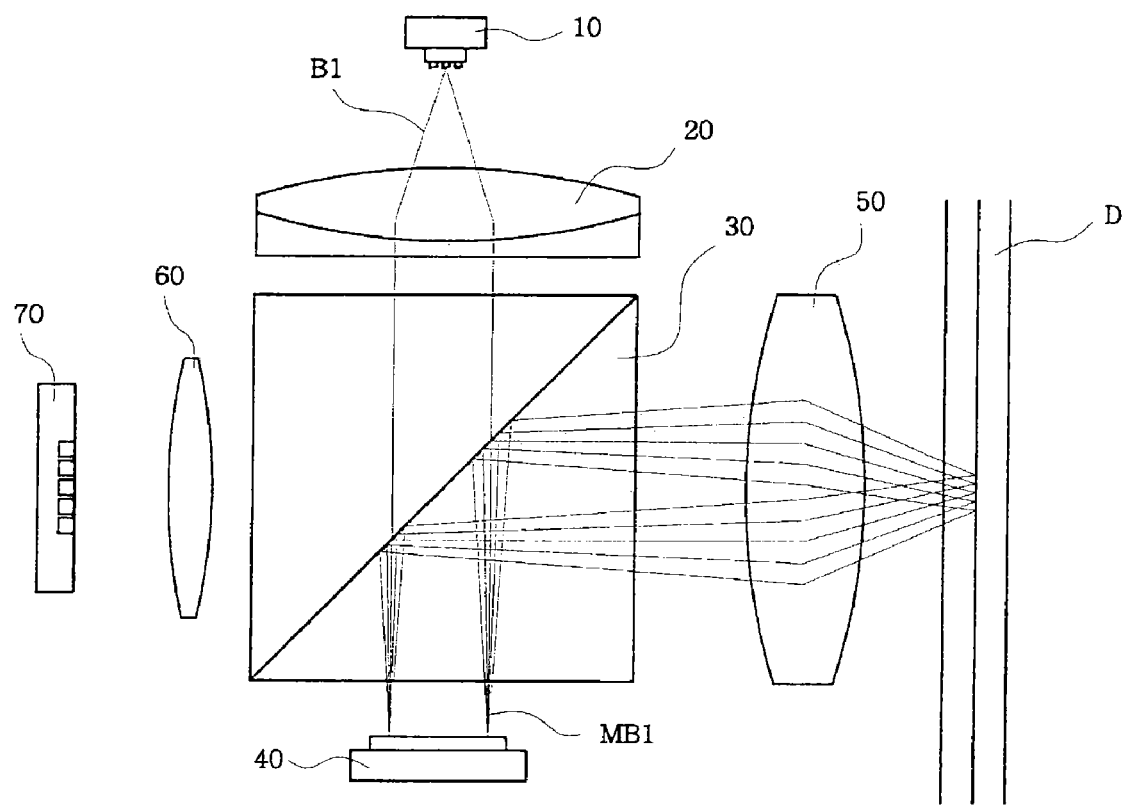
FIG. 3a is a view showing an optical path through which a light beam with a wavelength of 650 nm is generated and reaches an optical disk in the optical pickup of FIG. 2.
Figure 3B:
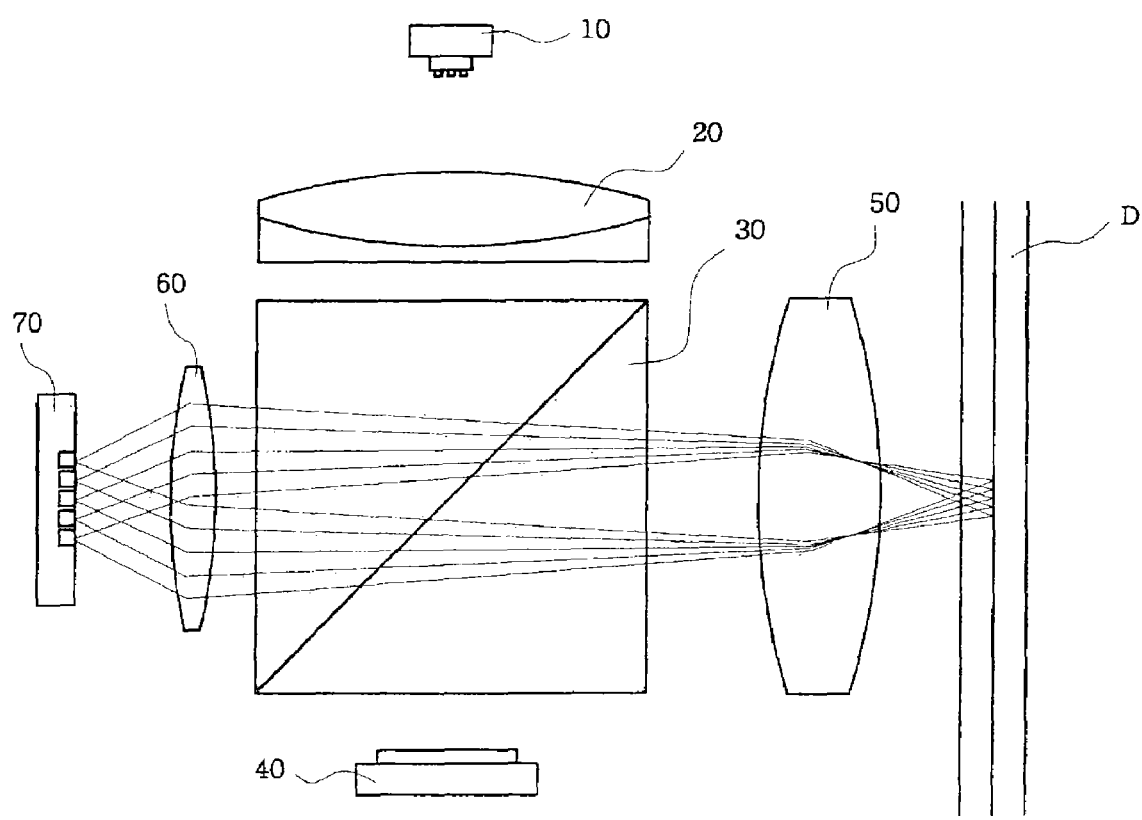
FIG. 3b is a view showing an optical path through which light beams with a wavelength of 650 nm reflected from the optical disk are focused on corresponding cells of a photo detector.

FIGS. 3a and 3b illustrate optical paths of the light beam with a wavelength of 650 nm applied to DVD products.

First, an optical path through which the generated light beam reaches an optical disk is described with reference to FIG. 3a. The light beam B1 with a wavelength of 650 nm is generated at the center portion of the light source module 10, and is converted into a parallel beam while passing through the achromatic lens 20.

The light beam B1 converted into the parallel beam is divided into multiple beams MB1 while being reflected and diffracted by the reflection and diffraction type optical modulator 40, after passing through the beam splitter 30.

At this time, the multiple beams MB1 include 0, ±1 and ±2 order diffraction light beams, and the light beam B1 incident on the optical modulator 40 has the same central path as the 0 order diffraction light beam of the multiple beams MB1.

The multiple beams MB1 formed in this way propagate toward the beam splitter 30 again, and are reflected and diffracted in the direction of the optical disk D by the beam splitter 30. The reflected and diffracted multiple beams MB1 are then focused on corresponding tracks of the optical disk D through the objective lens 50.

Next, an optical path through which light beams reflected from the optical disk reach the photo detector is described with reference to FIG. 3b. The multiple beams MB1 reflected from the signal tracks of the optical disk D are converted into parallel beams by the objective lens 50 and the parallel beams then pass through the beam splitter 30.

Further, the multiple beams MB1 having passed through the beam splitter 30 are focused on corresponding cells of the photo detector 70 by the sensor lens 60. The photo detector 70 converts information corresponding to the multiple beams MB1 into electrical signals.

Figure 4A:
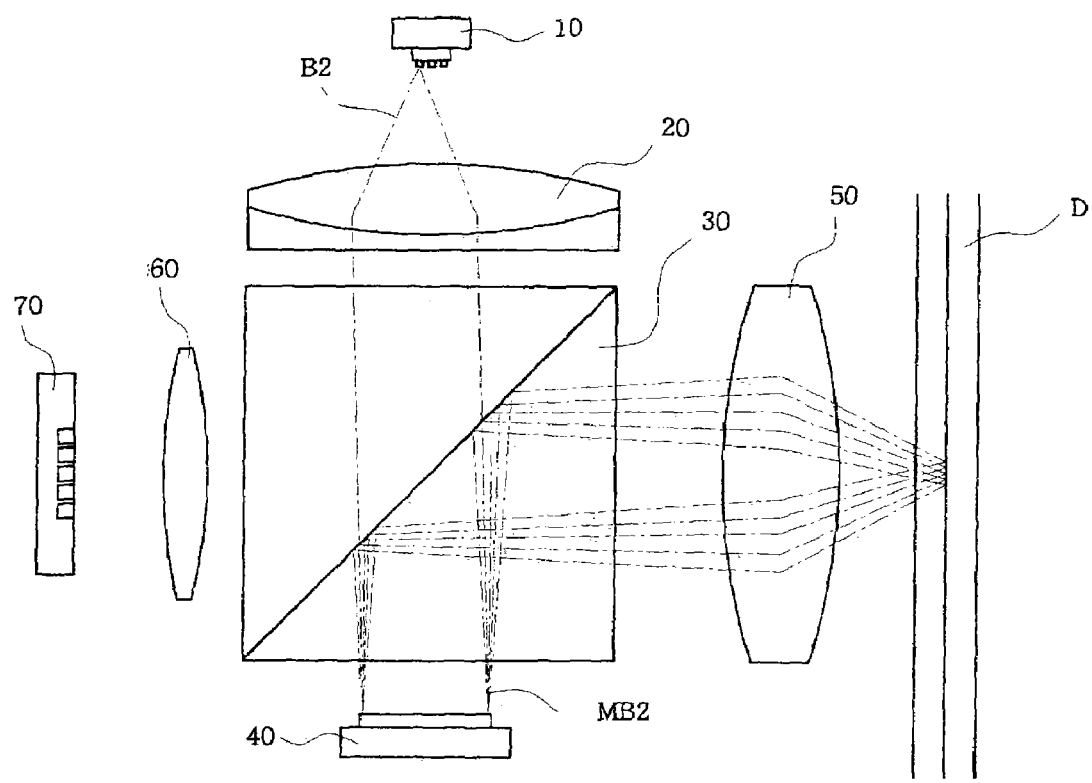
FIG. 4a is a view showing an optical path through which a light beam with a wavelength of 780 nm reaches an optical disk in the optical pickup of FIG. 2.
Figure 4B:
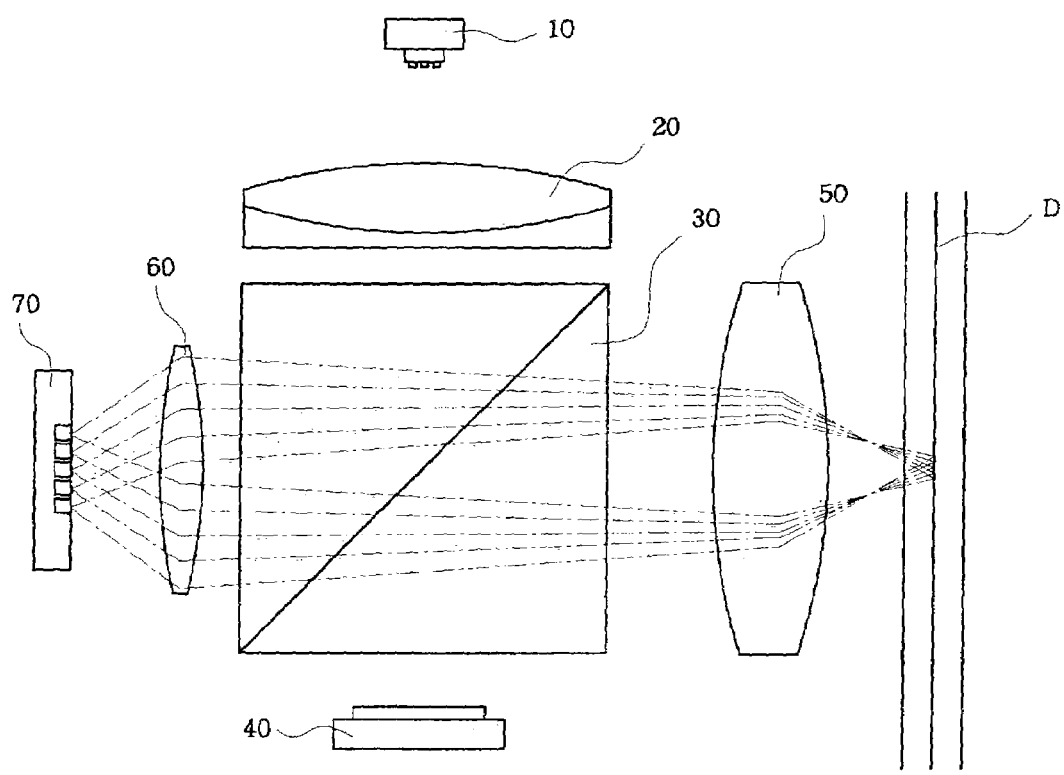
FIG. 4b is a view showing an optical path through which light beams with a wavelength of 780 nm reflected from the optical disk are focused on corresponding cells of a photo detector.

FIGS. 4a and 4b illustrate the optical paths of the light beam with a wavelength of 780 nm applied to CD products.

Referring to FIGS. 4a and 4b, the light beam with a wavelength of 780 nm has optical paths similar to the light beam with a wavelength of 650 nm. Therefore, a detailed description of the operation thereof is omitted.

However, there is a difference between the light beams with wavelengths of 780 nm and 650 nm in that the multiple beams MB2 include −3, −2, −1, 0 and +1 order diffraction light beams, and the light beam B2 incident on the optical modulator 40 has the same central path as the −1 order diffraction light beam of the multiple beams MB2. Therefore, light beams with wavelengths of 780 nm and 650 nm are not present on the same optic axis.

Figure 5A:
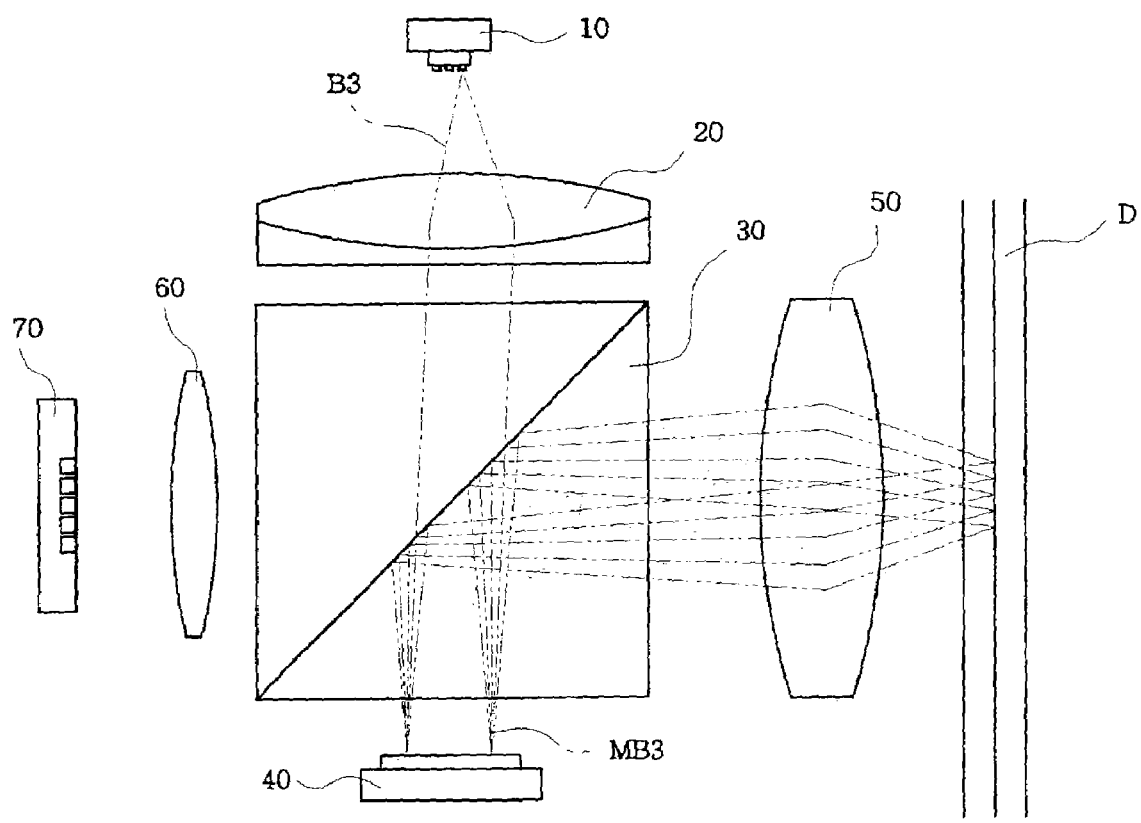
FIG. 5a is a view showing an optical path through which a light beam with a wavelength of 405 nm reaches an optical disk in the optical pickup of FIG. 2.
Figure 5B:
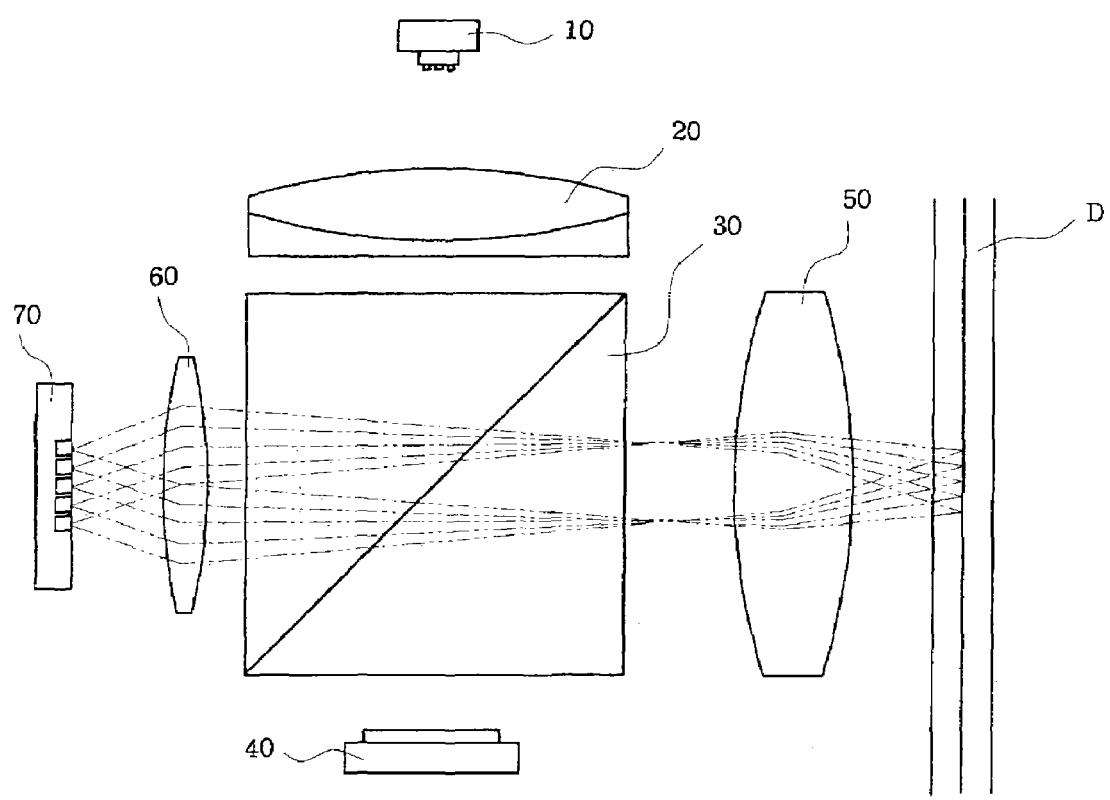
FIG. 5b is a view showing an optical path through which light beams with a wavelength of 405 nm reflected from the optical disk are focused on corresponding cells of a photo detector.

FIGS. 5a and 5b illustrate optical paths of the light beam with a wavelength of 405 nm applied to Blu-ray products.

Referring to FIGS. 5a and 5b, a light beam with a wavelength of 405 nm has optical paths similar to a light beam with a wavelength of 650 nm. Therefore, a detailed description of the operation thereof is omitted.

However, there is a difference between the light beams with wavelengths of 405 nm and 650 nm in that the multiple beams MB3 include −1, 0, +1, +2 and +3 order diffraction light beams, and the light beam B3 incident on the optical modulator 40 has the same central path as the +1 order diffraction light beam of the multiple beams MB3. Therefore, light beams with wavelengths of 405 nm and 650 nm are not present on the same optic axis.

In this way, since the optical pickup of the present invention generates light beams with three different wavelengths, it can be applied to various optical disk media, such as DVD products, CD products and Blu-ray products.

Further, the present invention is advantageous in that, since light beams with different wavelengths use the same optical parts, the number of parts is reduced, thus reducing the cost of the optical pickup and increasing competitiveness thereof.

Further, the present invention is advantageous in that, since it uses multiple beams, a plurality of data bits of an optical disk can be simultaneously read, thus increasing an information processing speed.

Figure 6:
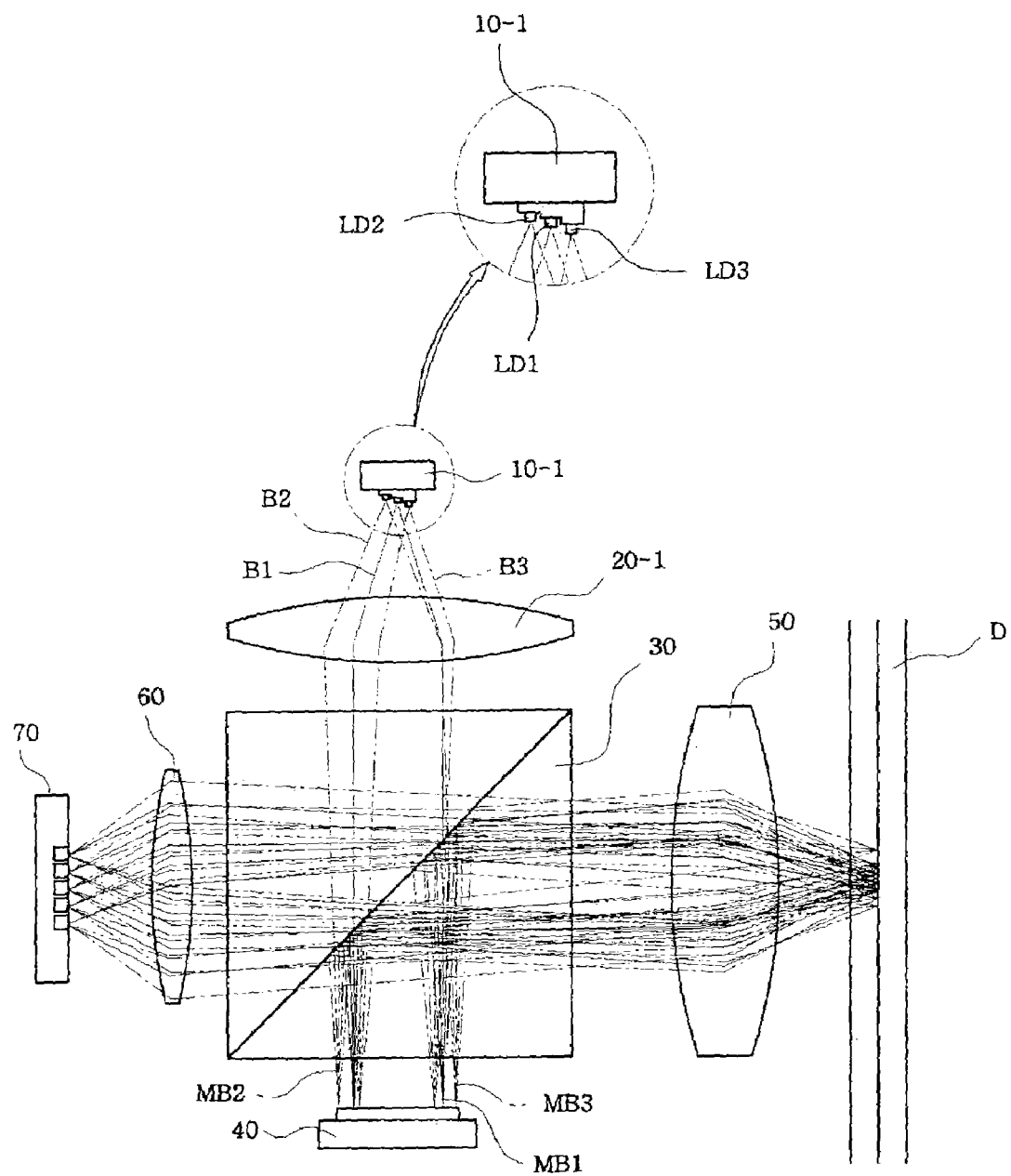
FIG. 6 is a view showing the construction of an optical pickup according to another embodiment of the present invention.

Meanwhile, FIG. 6 illustrates an optical pickup according to another embodiment of the present invention.

Referring to FIG. 6, when the embodiment of FIG. 6 is compared to the embodiment of FIG. 2, most components are identical, thus only different components are described below.

According to the embodiment of FIG. 6, a typical collimator lens 20-1 is used instead of the achromatic lens.

Further, a light source module 10-1 includes three chips LD1, LD2 and LD3, which emit light beams B1, B2 and B3 with different wavelengths, respectively, so as to selectively generate a plurality of light beams with different wavelengths. The chips LD1, LD2 and LD3 are arranged to be spaced apart from the collimator lens 20-1 by different distances to correct color aberrations. Therefore, light emitting surfaces of the chips which generate light beams with different wavelengths are arranged on different planes.

Preferably, the collimator lens 20-1 is constructed so that, if the collimate lens 20-1 is a refractive lens, a light beam incident from a light emitting surface of a chip positioned close to the collimator lens 20-1 among the plurality of light beams with different wavelengths, generated by the light source module 10-1, is a light beam with a short wavelength, and a light beam incident from a light emitting surface of a chip positioned far from the collimator lens 20-1 is a light beam with a long wavelength.

Preferably, the collimator lens 20-1 is constructed so that, if the collimator lens 20-1 is a diffractive lens, a light beam incident from a light emitting surface of a chip positioned close to the collimator lens 20-1 among the plurality of light beams with different wavelengths, generated by the light source module 10-1, is a light beam with a long wavelength, and a light beam incident from a light emitting surface of a chip positioned far from the collimator lens 20-1 is a light beam with a short wavelength.

If the embodiments of FIGS. 6 and 2 are compared to each other, the embodiment of FIG. 6 is different from the embodiment of FIG. 2 only in light emitting surfaces, and has the same optical paths and operating effects as the embodiment of FIG. 2. Therefore, a detailed description of the embodiment of FIG. 6 is omitted.

Figure 7:
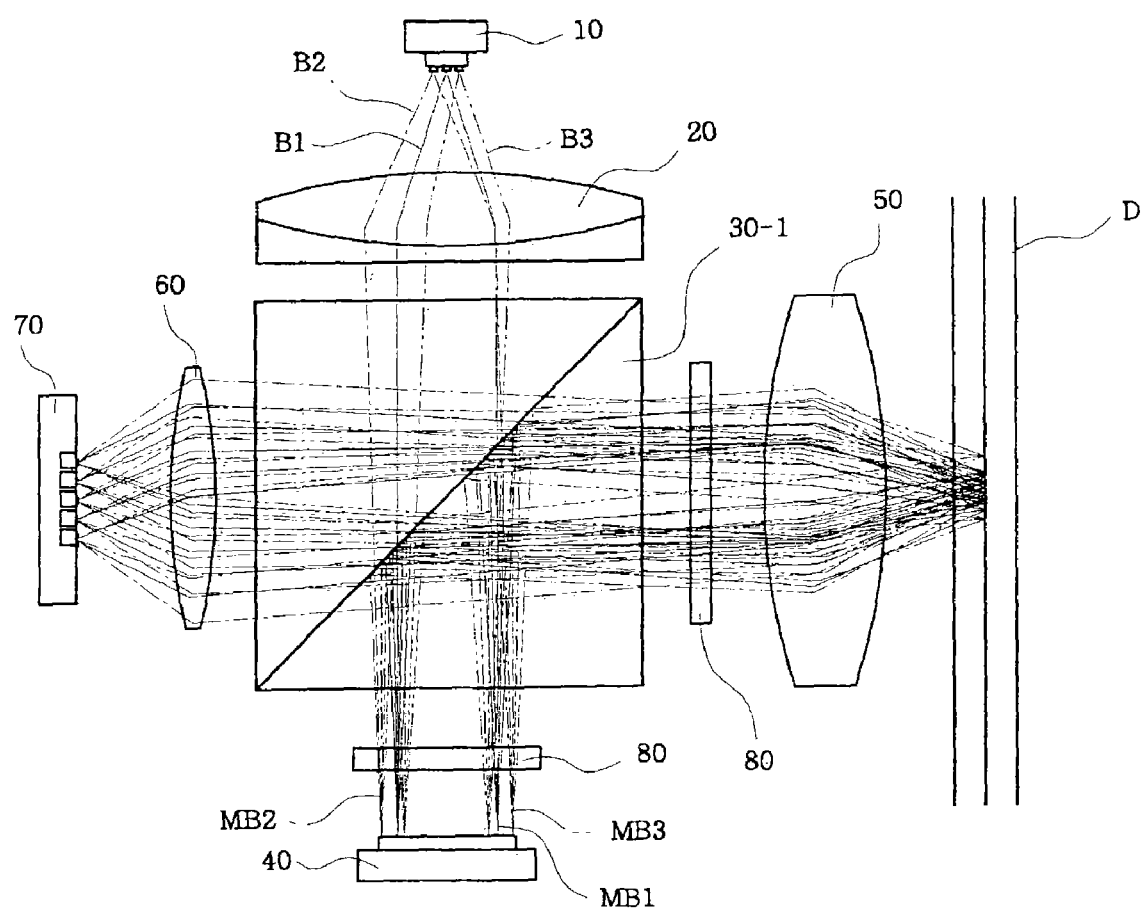
FIG. 7 is a view showing the construction of an optical pickup according to a further embodiment of the present invention.

Further, FIG. 7 illustrates an optical pickup according to a further embodiment of the present invention.

If the embodiments of FIGS. 7 and 2 are compared to each other, most components are identical, thus only different components are described below.

According to the embodiment of FIG. 7, a polarization beam splitter 30-1 is used instead of a typical beam splitter so as to increase the optical efficiency.

Further, quarter wave plates 80 for converting a passed beam into a circularly polarized beam are additionally disposed between the polarization beam splitter 30-1 and the optical modulator 40, and between the polarization beam splitter 30-1 and the objective lens 50, respectively.

Hereinafter, the optical paths and operations of the embodiment having the above construction are described.

Figure 8A:
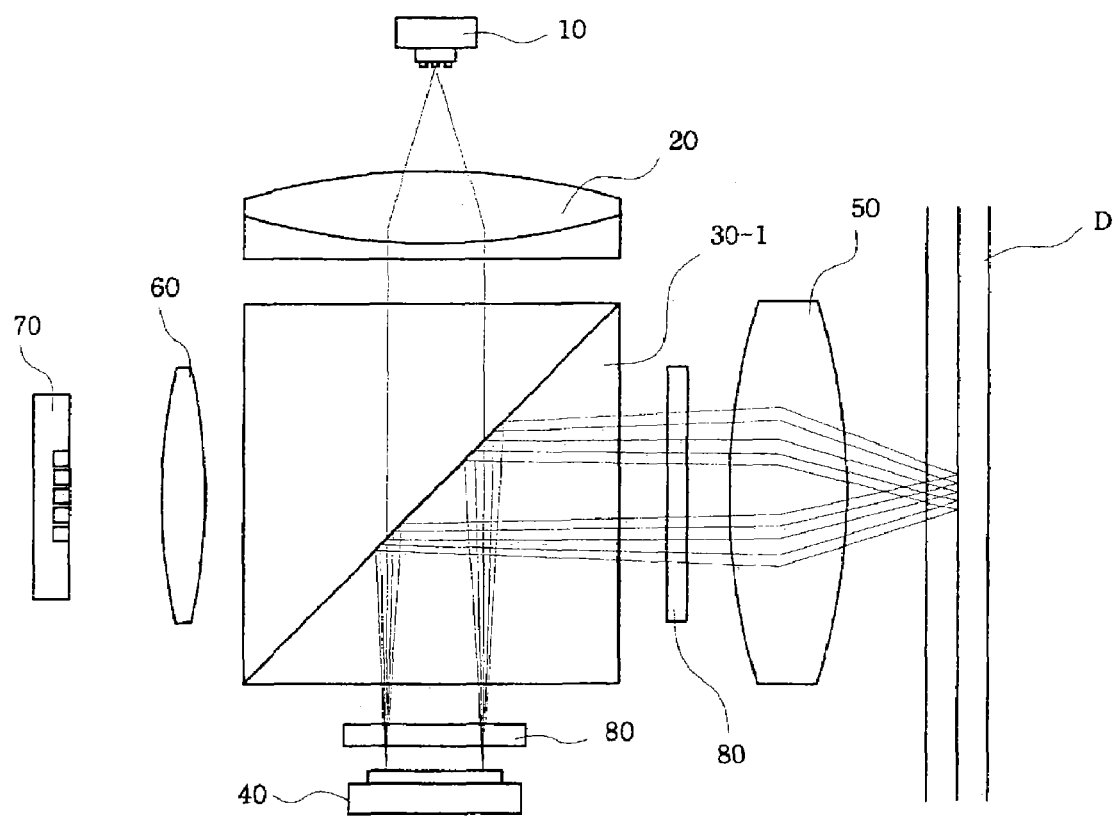
FIG. 8a is a view showing an optical path through which a light beam with a wavelength of 650 nm reaches an optical disk in the optical pickup of FIG. 7.
Figure 8B:
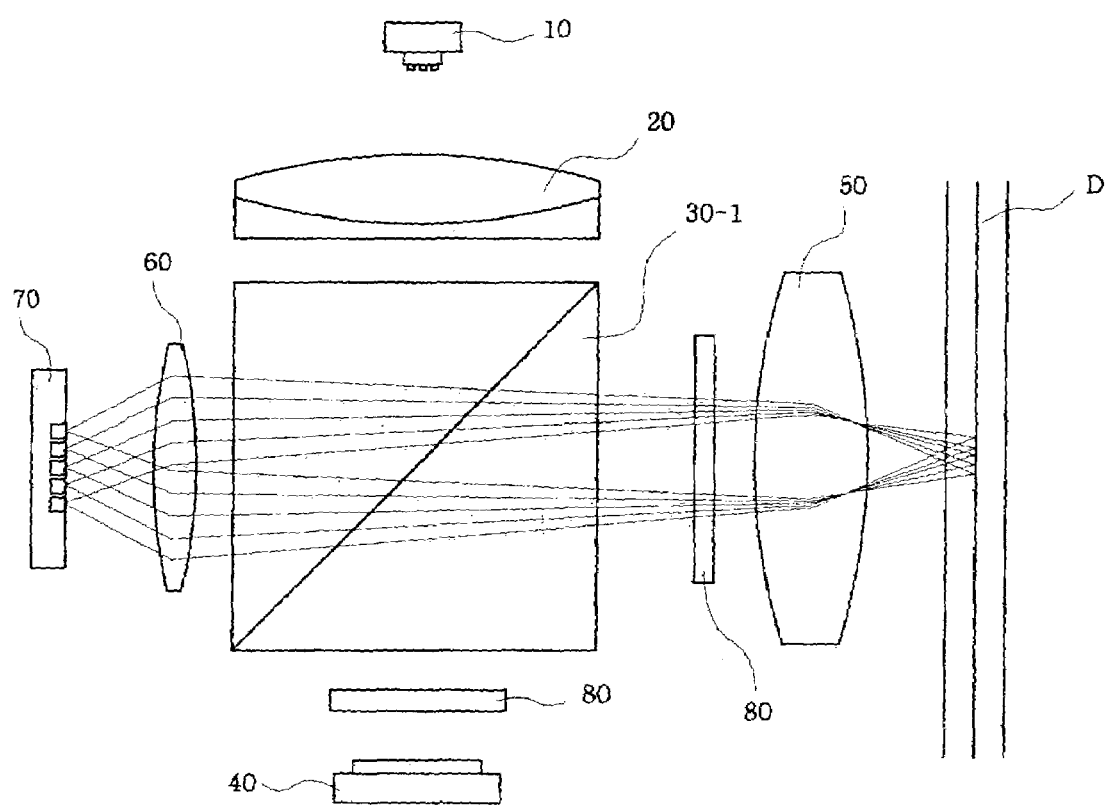
FIG. 8b is a view showing an optical path through which light beams with a wavelength of 650 nm reflected from the optical disk are focused on corresponding cells of a photo detector.

FIGS. 8a and 8b illustrate optical paths of the light beam with a wavelength of 650 nm.

Referring to FIG. 8a, a light beam B1 with a wavelength of 650 nm is generated at a center portion of the light source module 10, and is converted into a parallel beam while passing through the achromatic lens 20.

Only a P-polarization component of the light beam having passed through the achromatic lens 20 passes through the polarization beam splitter 30-1. The passed P-polarization component is converted into a circularly polarized beam by the quarter wave plate 80 to be incident on the reflection and diffraction type optical modulator 40.

The circularly polarized beam is divided into multiple beams MB1 while being reflected and diffracted by the optical modulator 40, and the multiple beams MB1 are converted into S-polarization components while passing through the quarter wave plate 80.

The multiple beams MB1 with the S-polarization components propagate toward the polarization beam splitter 30-1 again, and are reflected and diffracted by the polarization beam splitter 30-1 to propagate toward the quarter wave plate 80 disposed between the polarization beam splitter 30-1 and the objective lens 50.

The multiple beams MB1 with the S-polarization components having passed through the quarter wave plate 80 are converted again to circularly polarized beams and are focused on corresponding tracks of the optical disk D by the objective lens 50.

Referring to FIG. 8b, the multiple beams MB1 with the S-polarization components reflected from the signal tracks of the optical disk D are converted into parallel beams by the objective lens 50. The parallel beams are converted into P-polarization components while passing through the quarter wave plate 80, and they then pass through the polarization beam splitter 30-1.

The multiple beams MB1 having passed through the polarization beam splitter 30 are focused on corresponding cells of the photo detector 70 by the sensor lens 60. The photo detector 70 converts the optical energy of information corresponding to the multiple beams MB1 into electrical signals.

In this embodiment, only optical paths of the light beam with a wavelength of 650 nm are described. Since light beams with wavelengths of 780 nm and 405 nm have the same optical paths and perform the same operations as the light beam with a wavelength of 650 nm, a detailed description thereof is omitted.

However, the light beam B2 with a wavelength of 780 nm has the same central path as a −1 order diffraction light beam of the multiple beams MB2 reflected and diffracted by the optical modulator 40. The light beam B3 with a wavelength of 405 nm has the same central path as +1 order diffraction light beam of the multiple beams MB3 reflected and diffracted by the optical modulator. Therefore, the light beams with wavelengths of 780 nm and 405 nm are not present on the same optic axis as the light beam with a wavelength of 650 nm.

The embodiment of FIG. 7 constructed and operated as described above can promptly process optical disk information and can be applied to various optical disk media, similar to the above embodiments of FIGS. 2 and 6. In addition, the embodiment of FIG. 7 can increase the optical efficiency by reducing the optical loss using the polarization beam splitter.

Figure 9:
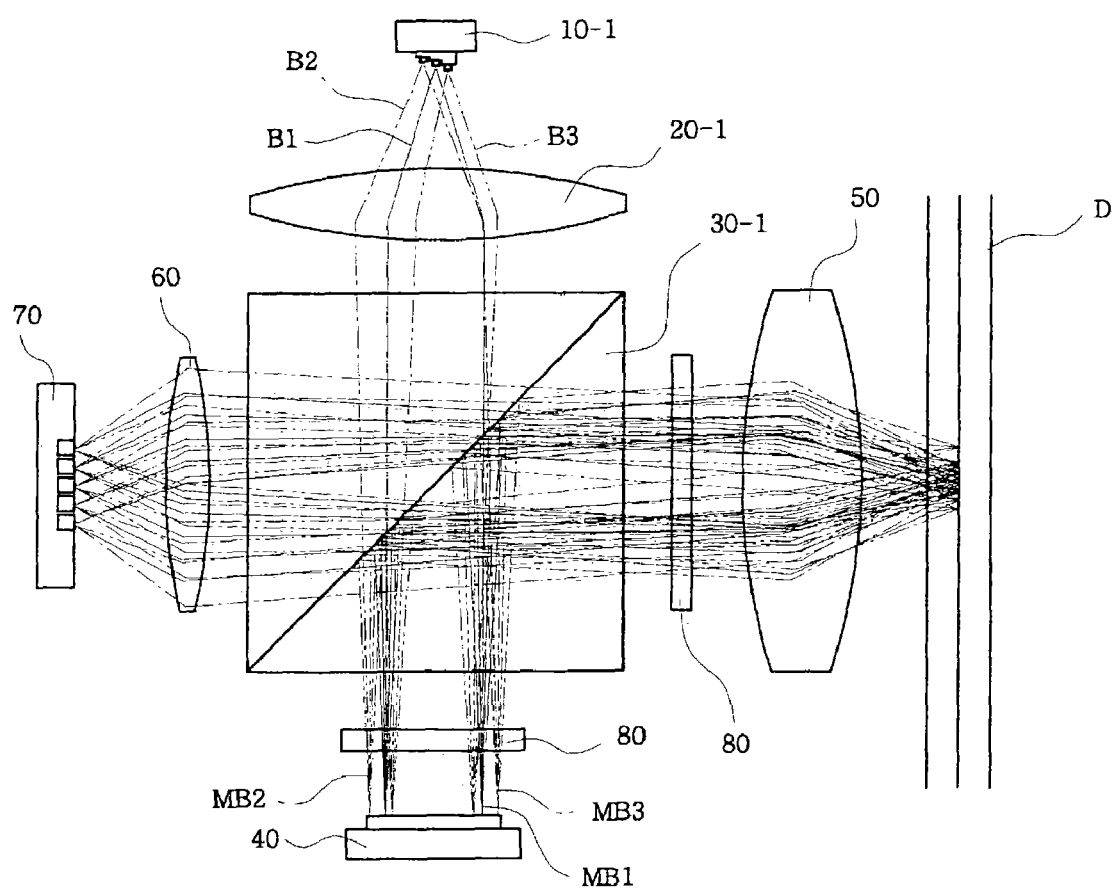
FIG. 9 is a view showing the construction of an optical pickup according to still another embodiment of the present invention.

FIG. 9 illustrates an optical pickup according to still another embodiment of the present invention.

Referring to FIG. 9, this embodiment is different from other embodiments in that the polarization beam splitter and the quarter wave plate of the embodiment of FIG. 7 are applied to the embodiment of FIG. 6.

Properly, the operation and effect of the embodiment of FIG. 9 is the same as those of other embodiments. Therefore, a detailed description thereof is omitted.

Meanwhile, the present invention is constructed to generate light beams with three different wavelengths in the above embodiments. However, the present invention can be constructed to generate light beams with three or more different wavelengths, such as four or five, according to products.

Further, in the above embodiments of the present invention, multiple beams have five beams. However, they can have three or seven beams.

Meanwhile, the above embodiments of the optical pickup according to the present invention can be applied to various types of optical recording and reproducing apparatuses. Therefore, these optical recording and reproducing apparatuses are included in the scope of the present invention.

As described above, the present invention provides an optical pickup and optical recording and reproducing apparatus using the same, which can promptly process optical disk information and cope with various types of optical disk media using a light source module for selectively generating light beams with different wavelengths and an optical modulator for reflecting and diffracting an incident light beam to generate multiple beams.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup, comprising:
 a light source module for selectively generating a plurality of light beams with different wavelengths;
 an achromatic lens for converting the light beams into parallel beams;
 a beam splitter disposed on an optical path to pass the light beams therethrough and reflect the light beams;
 an optical modulator designed to divide each of incident light beams having passed through the beam splitter into multiple beams, and reflect and diffract the multiple beams in a direction of the beam splitter, the optical modulator comprising a substrate and a plurality of unit cells on the substrate, the unit cells being converted to correspond to wavelengths of the light beams generated by the light source module;
 an objective lens for focusing multiple beams, reflected and diffracted by the optical modulator and then reflected from the beam splitter in a direction of an optical disk, on corresponding tracks of the optical disk; and
 a photo detector for detecting multiple beams reflected from the tracks of the optical disk and converting the detected multiple beams into electrical signals.

2. The optical pickup according to claim 1, further comprising a sensor lens for focusing the multiple beams, reflected from the tracks of the optical disk, on corresponding cells of the photo detector.

3. The optical pickup according to claim 1 or 2, wherein the multiple beams are formed so that a final interval between respective beams thereof is identical to a track pitch of the optical disk.

4. The optical pickup according to claim 1 or 2, wherein the light source module is formed so that light emitting surfaces for emitting the light beams with different wavelengths are arranged on an identical plane.

5. The optical pickup according to claim 1 or 2, wherein the light beams are formed so that a first light beam with a first wavelength, generated at a center portion of the light source module among the plurality of light beams, has the same central path as a 0 order diffraction light beam of multiple beams formed while being reflected and diffracted by the optical modulator, a second light beam with a second wavelength has the same central path as a −1 order diffraction light beam of the multiple beams, and a third light beam with a third wavelength has the same central path as +1 order diffraction light beam of the multiple beams.

6. The optical pickup according to claim 1 or 2, wherein the plurality of light beams are light beams with wavelengths of 405 nm, 650 nm and 780 nm, respectively.

7. The optical pickup according to claim 1 or 2, wherein the beam splitter is a polarization beam splitter, the optical pickup further comprising quarter wave plates are disposed between the polarization beam splitter and the optical modulator, and between the polarization beam splitter and the objective lens, respectively, to convert a light beam into a circularly polarized beam.

8. An optical pickup, comprising:
 a light source module for selectively generating a plurality of light beams with different wavelengths, the light source module having light emitting surfaces for different wavelengths arranged on different planes to correct color aberrations;
 a collimator lens for converting the light beams into parallel beams;
 a beam splitter disposed on an optical path to pass the light beams therethrough and reflect the light beams;
 an optical modulator designed to divide each of incident light beams having passed through the beam splitter into multiple beams, and reflect and diffract the multiple beams in a direction of the beam splitter, the optical modulator comprising a substrate and a plurality of unit cells on the substrate, the unit cells being converted to correspond to wavelengths of the light beams generated by the light source module;

an objective lens for focusing multiple beams, reflected and diffracted by the optical modulator and then reflected from the beam splitter in a direction of an optical disk, on corresponding tracks of the optical disk; and a photo detector for detecting multiple beams reflected from the tracks of the optical disk and converting the detected multiple beams into electrical signals.

9. The optical pickup according to claim 8, further comprising a sensor lens for focusing the multiple beams, reflected from the tracks of the optical disk, on corresponding cells of the photo detector.

10. The optical pickup according to claim 8 or 9, wherein the collimator lens is a refractive lens, and a light beam incident from a light emitting surface positioned close to the collimator lens among the plurality of light beams with different wavelengths, generated by the light source module, is a light beam with a short wavelength, and a light beam incident from a light emitting surface positioned far from the collimator lens is a light beam with a long wavelength.

11. The optical pickup according to claim 8 or 9, wherein the collimator lens is a diffractive lens, and a light beam incident from a light emitting surface positioned close to the collimator lens among the plurality of light beams with different wavelengths, generated by the light source module, is a light beam with a long wavelength, and a light beam incident from a light emitting surface positioned far from the collimator lens is a light beam with a short wavelength.

12. The optical pickup according to claim 8 or 9, wherein the light beams are formed so that a first light beam with a first wavelength, generated at a center portion of the light source module among the plurality of light beams, has the same central path as a 0 order diffraction light beam of multiple beams formed while being reflected and diffracted by the optical modulator, a second light beam with a second wavelength has the same central path as a −1 order diffraction light beam of the multiple beams, and a third light beam with a third wavelength has the same central path as +1 order diffraction light beam of the multiple beams.

13. The optical pickup according to claim 8 or 9, wherein the plurality of light beams are light beams with wavelengths of 405 nm, 650 nm and 780 mm respectively.

14. The optical pickup according to claim 8 or 9, wherein the beam splitter is a polarization beam splitter, the optical pickup further comprising quarter wave plates are disposed between the polarization beam splitter and the optical modulator, and between the polarization beam splitter and the objective lens, respectively, to convert a light beam into a circularly polarized beam.

* * * * *